(12) United States Patent
Kuribayashi

(10) Patent No.: US 7,034,412 B2
(45) Date of Patent: Apr. 25, 2006

(54) CONTROL APPARATUS AND METHOD OF ELECTRIC ROTATING MACHINE FOR VEHICLE

(75) Inventor: Masaru Kuribayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 405 days.

(21) Appl. No.: 10/434,279

(22) Filed: May 9, 2003

(65) Prior Publication Data
US 2003/0222513 A1 Dec. 4, 2003

(30) Foreign Application Priority Data
Jun. 3, 2002 (JP) .......................... P2002-161776

(51) Int. Cl.
*B60L 1/00* (2006.01)
(52) U.S. Cl. .................. 307/9.1; 307/10.1; 318/156
(58) Field of Classification Search ............... 318/156; 180/270; 290/24
See application file for complete search history.

(56) References Cited

U.S. PATENT DOCUMENTS 4,319,170 A * 3/1982 Brent .......................... 318/376
4,426,610 A * 1/1984 Kawada et al. ............. 318/798
5,512,811 A * 4/1996 Latos et al. .................... 322/10
5,747,909 A * 5/1998 Syverson et al. ....... 310/156.56
6,713,888 B1 * 3/2004 Kajiura ..................... 290/40 F

FOREIGN PATENT DOCUMENTS

JP 6-261419 A 9/1994

* cited by examiner

*Primary Examiner*—Lynn Feild
*Assistant Examiner*—Michael Rutland-Wallis
(74) *Attorney, Agent, or Firm*—Sughrue Mion, PLLC

(57) ABSTRACT

A control apparatus and method for controlling an electric rotating machine for vehicle reduces shock at the time of switching power generation mode. The control apparatus include an electric rotating machine functioning as a starter motor and a charging generator 1, an inverter comprised of switching elements 14 to 19, a field current controller 5 for controlling an electric current of a field coil 4 of the electric rotating machine 1, and a controller 24 by which power is generated in an inverter generation mode in a low-speed rotation range and in an alternator generation mode in a high-speed rotation range. A hysteresis is established between a rotating speed in switching from the inverter generation mode to the alternator generation mode and a rotating speed in switching from the alternator generation mode to the inverter generation mode under the control of the controller 24.

10 Claims, 3 Drawing Sheets

CONTROL APPARATUS AND METHOD OF ELECTRIC ROTATING MACHINE FOR VEHICLE

BACKGROUND OF THE INVENTION

1. Field of the Invention

The present invention relates to a control apparatus and a method for controlling an electric rotating machine for vehicle, in which the electric rotating machine acts as a starter motor when an internal combustion engine is started and acts as a generator after the internal combustion engine has started.

2. Description of the Related Art

It is a recent trend that a system, in which internal combustion engine stops upon stopping the vehicle (i.e., idle stop), has been increasingly adopted in vehicles in consideration of reduction in carbon dioxide emission and improvement in fuel consumption. In those vehicles, number of starts of the internal combustion engine increases inevitably. It is therefore preferable to adopt a combined starter motor/charging generator in which the internal combustion engine and the electric rotating machine are combined at all times and less noise is produced as compared with a conventional starter motor operated by engagement of a pinion with a ring gear (flywheel starter gear). For example, the Japanese Patent Publication (unexamined) No. 261419/1994 discloses a hybrid car that runs with a motor driven by electric power supplied from a generator driven by an internal combustion engine, in which this generator functions as a starter motor.

In the art disclosed in this Japanese Patent Publication (unexamined) No. 261419/1994, the generator functions also as a starter motor, which saves space for installing a starter motor. When a vehicle-mounted battery supplies an electric power to the starter motor, the electric power is supplied from an inverter that supplies electric power to the vehicle driving motor, and it is therefore necessary to temporarily stop supplying electric power to the vehicle driving motor. In order to prevent a shock caused by such stopping and resuming of electric supply generated during running of the vehicle, the internal combustion engine is started by the starter motor only when change in load of the vehicle driving motor is small.

The foregoing art is peculiar to hybrid cars and is not necessary for vehicles other than the hybrid cars. However, in the foregoing case where the combined starter motor/charging generator (hereinafter referred to electric rotating machine) is used for the purpose of reducing noise and saving space, the electric rotating machine requires a torque and a rotating speed for starting the internal combustion engine. Accordingly, in order to obtain these motor characteristics within a limited space, the generator characteristics are sacrificed and it is not possible to obtain charging voltage for the vehicle-mounted battery when the electric rotating machine rotates at a low speed. Therefore, when the electric rotating machine is used as a charging generator, it is necessary to perform switching between inverter (power) generation mode in which step-up chopper control of the generated voltage is carried out by applying a phase-controlled alternating current from an inverter to the armature coil and alternator (power) generation mode in which a predetermined target voltage is obtained by applying a field current.

This switchover between the inverter generation mode and the alternator generation mode is carried out through a method as shown in the form of operation characteristics in FIGS. 5 and 6. FIG. 5 shows a case where the power generation mode is switched (shifted) from the inverter generation mode to the alternator generation mode, and FIG. 6 shows a case where the power generation mode is switched from the alternator generation mode to the inverter generation mode. Referring to FIG. 5, in the case where the power generation mode is switched from the inverter generation mode to the alternator generation mode, when the rotating speed of the electric rotating machine has reached a predetermined value, a command for changing the field current to 0 is given at t11 of time base, and the field current is changed to 0 by a time constant of a field coil as shown in the drawing. Subsequently, a torque command value becomes 0 at t12, and an inverter-driving signal to apply the alternating current becomes "off". The field current is increased gradually from t13, and the switchover to the alternator generation mode completes at t14.

On the other hand, in the case where the power generation mode is switched from the alternator generation mode to the inverter generation mode, referring to FIG. 6, when the rotating speed of the electric rotating machine has reached a predetermined value, a command for changing the field current to 0 is given at t21 of the time base, and the field current is changed to 0 by the time constant of the field coil. Subsequently, the inverter-driving signal to apply the alternating current to an armature coil becomes "on" at t22 under the state of the torque command value being 0, thus application of the alternating current being started. The field becomes "on" again at t23. A torque command is given at t24, and the inverter controls the alternating current according to this torque command. The switchover to the inverter generation mode completes at t25.

In the conventional control system of above arrangement, when the power generation mode is switched as described above, the field current is interrupted and recovered after the switchover, and it is therefore possible to prevent troubles such as breakage of a circuit element due to abnormal voltage, an impossibility to apply the alternating current due to the voltage generated by the electric rotating machine. However, in the case of carrying out either of these two switchovers of the power generation mode at a predetermined rotating speed, when the driving condition comes into a state that engine speed of the internal combustion engine is held at a specific rotating speed, the switchover between one power generation mode and another takes place frequently. Thus, the field current is interrupted and power generation is interrupted undesirably every time the power generation mode is switched over. This makes the vehicle-mounted battery to loose its balance between charge and discharge resulting in lowering power source voltage. Moreover, the driving torque required by the electric rotating machine varies depending upon the power generation mode even if the electric load is the same. Consequently, the switchover of the power generation mode is accompanied by a change in engine speed of the internal combustion engine, eventually resulting in occurrence of a shock.

SUMMARY OF THE INVENTION

The present invention was made to solve the above-discussed problem and has an object of obtaining a an apparatus and a method for controlling an electric rotating machine for vehicle in which the power generation mode is not frequently switched during driving the internal combustion engine at a specific rotating speed and a shock generated at the time of switching the power generation mode is reduced or decreased.

To accomplish the foregoing object, a control apparatus for controlling an electric rotating machine for vehicle according to the invention includes: an electric rotating machine having an armature coil and a field coil, being connected to an internal combustion engine for vehicle, and functioning as a starter motor as well as a charging generator; an inverter for supplying an alternating current to the armature coil of the electric rotating machine; field current control means for controlling electric current of the field coil; and control means. When the electric rotating machine functions as a charging generator, this control means performs a control so that power is generated in an inverter generation mode in which a phase-controlled alternating current is applied from the inverter to the mentioned armature coil and a generated voltage is subject to step-up chopper control in low-speed rotation range, and that power is generated in an alternator generation mode by controlling the electric current of the field coil in high-speed rotation range. In the mentioned control apparatus, a hysteresis is established between a rotating speed switched from the inverter generation mode to the alternator generation mode and a rotating speed switched from the alternator generation mode to the inverter generation mode under the control performed by the control means.

As a result, it is possible to avoid frequent switchover of the power generation mode even if the internal combustion engine is operated at a specific rotating speed depending upon driving conditions of the vehicle. Furthermore, it is possible to prevent insufficient charge that occurs, when the power generation mode is switched over, and reduces frequent occurrence of shock due to change in engine speed of the internal combustion engine.

In a control method for controlling an electric rotating machine for vehicle according to the invention, when the electric rotating machine, which is connected to an internal combustion engine for vehicle and functions as a starter motor as well as a charging generator, functions as a charging generator, power is generated in an inverter generation mode in which phase-controlled alternating current is applied from the inverter to an armature coil of the electric rotating machine and generated voltage is subject to step-up chopper control in a low-speed rotation range, and power is generated in an alternator generation mode in which electric current of a field coil of the electric rotating machine is controlled in a high-speed rotation range. The control method includes the steps of switching the power generation mode from the inverter generation mode to the alternator generation mode at a first predetermined rotating speed when the rotating speed is increased, and switching the power generation mode from the alternator generation mode to the inverter generation mode at a second predetermined rotating speed when the rotating speed is reduced. Thus a difference is established between the first predetermined rotating speed and the second predetermined rotating speed.

As a result, it is possible to prevent frequent switchover of the power generation mode even if the internal combustion engine is operated at a specific rotating speed. Furthermore, it is possible to prevent insufficient charge that occurs, when the power generation mode is switched over, and reduces frequent occurrence of shock due to change in engine speed of the internal combustion engine.

DESCRIPTION OF THE PREFERRED EMBODIMENTS

Embodiment 1

Figure 1:
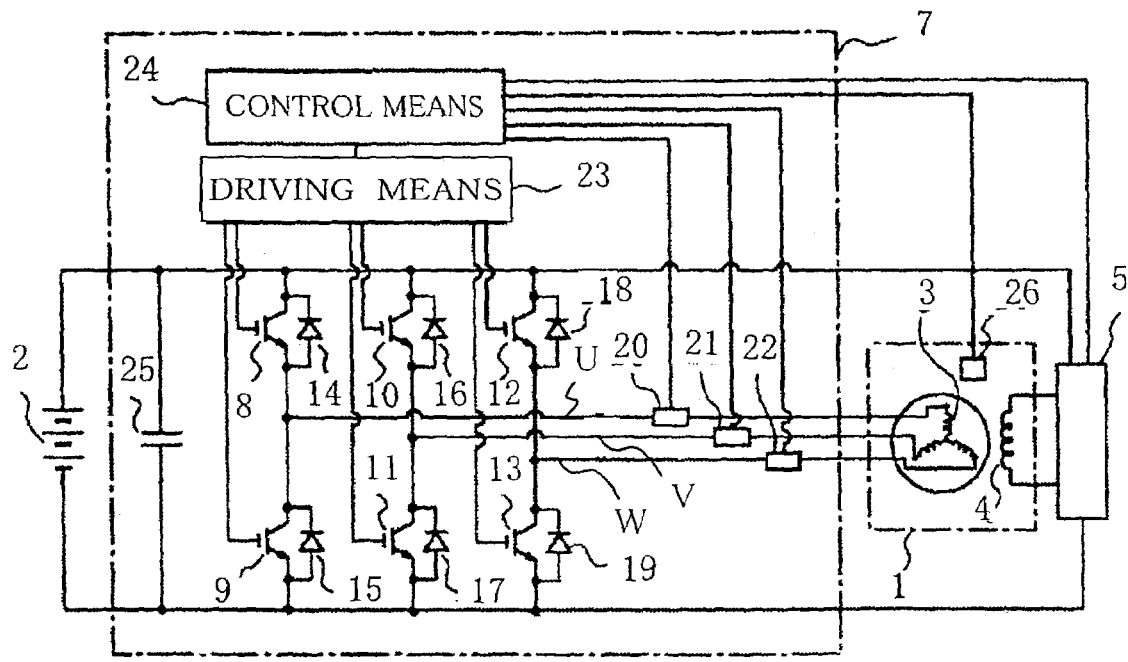
FIG. 1 is a schematic circuit diagram for explaining a control apparatus for controlling an electric rotating machine for vehicle according to Embodiment 1 of the present invention.
Figure 2:
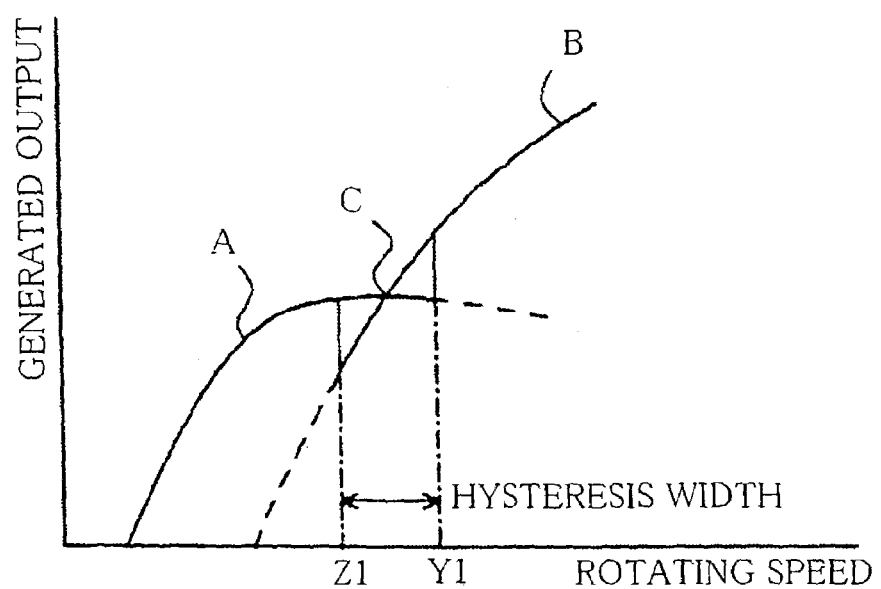
FIG. 2 is a characteristic diagram for explaining the control apparatus for controlling an electric rotating machine for vehicle according to Embodiment 1 of the invention.

FIGS. 1 and 2 are drawings for explaining a control apparatus and a control method for controlling an electric rotating machine for vehicle according to Embodiment 1 of the present invention. FIG. 1 is a schematic circuit diagram of the electric rotating machine for vehicle and the control apparatus for controlling the electric rotating machine, and FIG. 2 is a characteristic diagram for explaining operation. Referring to FIG. 1, reference numeral 1 is an electric rotating machine that is connected to a vehicle-mounted internal combustion engine and functions as a starter motor for starting the internal combustion engine not shown as well as a charging generator for charging a vehicle-mounted battery 2. The electric rotating machine 1 includes a stator having, for example, a three-phase armature coil 3 and a rotor having a field coil 4. The field coil 4 is supplied with a field current from the battery 2 through a field current control means 5. When a power is generated, the field current control means 5 controls a field current so that output voltage of the armature coil 3 is a target voltage.

A control unit 7 controls the electric rotating machine 1. The control unit 7 includes an inverter circuit in which switching elements 8 to 13 such as IGBT are connected in three-phase bridge connection, and diodes 14 to 19 that are connected to the switching elements 8 to 13 respectively in back-to-back connection and form a rectifier. The control unit 7 also includes current detecting means 20 to 22 for detecting current of each phase, and driving means 23 for driving switching elements 8 to 13 of the inverter circuit by a PWM signal. The control unit 7 further includes control means 24 for inputting a current value from the current detecting means 20 to 22 for detecting current of each phase and a rotational position of the electric rotating machine detected by a rotational position sensor 26, and controls the function as a starter motor and that as a charging generator performed by the electric rotating machine 1.

In the inverter circuit and the rectifier, the switching element 8 and the diode 14 form a U-phase upper arm, the switching element 9 and the diode 15 form a U-phase lower arm, the switching element 10 and the diode 16 form a V-phase upper arm, the switching element 11 and the diode 17 form a V-phase lower arm, the switching element 12 and the diode 18 form a W-phase upper arm, and the switching element 13 and the diode 19 form a W-phase lower arm. Connection point (junction) between the upper arm and the lower arm in each phase is connected to the armature coil 3 of each phase of the electric rotating machine 1. A condenser 25 smoothes the electric current of the inverter circuit, and the rotational position sensor 26 measures the rotational position of the rotor of the electric rotating machine 1 as mentioned above.

In the apparatus for controlling an electric rotating machine for vehicle according to Embodiment 1 of the invention of above constitution, when the internal combustion engine is started, the control means 24 causes the driving means 23 to operate. A PWM signal corresponding to the rotational position of the electric rotating machine 1 detected by the rotational position sensor 26 is given to the switching elements 8 to 13, thereby the electric rotating machine 1 is driven as a synchronous motor. After starting the internal combustion engine, the electric rotating machine 1 acts as a synchronous generator. When the rotating speed is not higher than a predetermined value, the control means 24 causes the switching elements 8 to 13 to operate, and supplies the armature coil 3 with a phase-controlled alternating current as described later. In this rotation range, the inverter applies the phase-controlled alternating current to the armature coil of the electric rotating machine and a generated voltage is subject to step-up chopper control, thus output of the electric rotating machine 1 being controlled. Power generation under this condition is hereinafter referred to as inverter generation mode.

When the rotating speed of the electric rotating machine 1 is higher than the predetermined value and reaches a rotating speed enabling to obtain a sufficient generated voltage, the control means 24 detects such a condition. Upon such detection, the control means 24 stops the operation of the switching elements 8 to 13, i.e., operation of the inverter. Further, the control means 24 makes a control so that the electric rotating machine 1 charges the battery 2 while the output voltage being adjusted to the target voltage by the field current control means 5. Power generation under this condition is hereinafter referred to as alternator generation mode. In both inverter generation mode and alternator generation mode, the battery 2 is charged with the output of the electric rotating machine 1 via the full wave rectifier comprised of the diodes 14 to 19.

The control means 24 switches the power generation mode between the inverter generation mode and the alternator generation mode according to the rotating speed of the electric rotating machine 1. Now the operation of the control means 24 in this embodiment is hereinafter described with reference to the characteristic diagram in FIG. 2. Referring to FIG. 2, the axis of abscissas indicates a rotating speed of the electric rotating machine 1, and the axis of ordinates indicates a generated output. A curve A indicates an output characteristic in the inverter generation mode, and a curve B indicates an output characteristic in the alternator generation mode. In the alternator generation mode, the field current flowing through the field coil 4 generates power. In the inverter generation mode, the output in the low-speed rotation range is increased by the step-up chopper control of the inverter. The output characteristic of the alternator generation mode and the output characteristic of the inverter generation mode cross each other at a point C.

Accordingly, in the low-speed rotation range, the output in the inverter generation mode is higher than that in the alternator generation mode, and therefore power is generated in the inverter generation mode. When the rotating speed of the electric rotating machine 1 is increased, the control means 24 switches the power generation mode to the alternator generation mode at a point Y1 in FIG. 2, and power is generated in the alternator generation mode within the high-speed rotation range. On the other hand, when the rotating speed of the electric rotating machine 1 is decreased, the control means 24 switches the power generation mode to the inverter generation mode at a point Z1 in FIG. 2. These switchovers are carried out by the control means 24 on the basis of the rotating speed of the electric rotating machine 1 or the output voltage detected by the control means 24. A difference is established in the rotating speed at the time of switching the power generation mode depending upon whether the rotating speed is increased or decreased, and a hysteresis is established.

As mentioned in the foregoing description about the problems to be solved, at the time of switching the power generation mode, the field current is interrupted for a predetermined time. This is to avoid troubles such as breakage of circuit element due to abnormal voltage, impossibility of applying the alternating current due to the generated voltage of the electric rotating machine 1. As a result of such interruption, the vehicle-mounted battery 2 is not sufficiently charged and a shock is generated due to switching of the power generation mode. However, as described above, in this embodiment, switchover of the power generation mode is carried out securing a hysteresis in the rotating speed depending upon whether the rotating speed of the electric rotating machine 1 is increased or that of the electric rotating machine 1 is decreased. Consequently, even if the operation continues with a specific rotating speed (for example, the point C), small changes in rotating speed do not bring about any frequent switchover of the power generation mode. It is therefore possible to prevent the shock caused by change in engine speed of the internal combustion engine that might occur if the power generation mode is frequently switched over. Insufficient charging and so on are also prevented.

Embodiment 2

Figure 3:
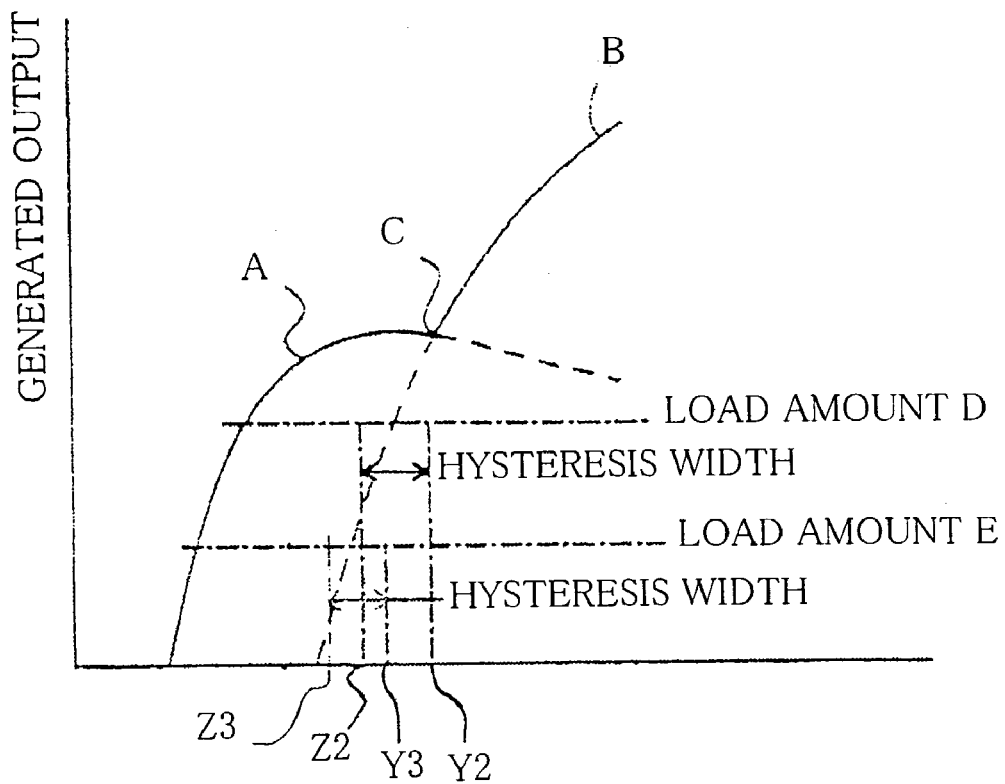
FIG. 3 is a characteristic diagram for explaining a control apparatus for controlling an electric rotating machine for vehicle according to Embodiment 2 of the invention.

FIG. 3 is a characteristic diagram for explaining operation of a control apparatus and control method for controlling an electric rotating machine for vehicle according to Embodiment 2 of the invention. The control apparatus and control method for controlling an electric rotating machine for vehicle according to this embodiment differs from that in the foregoing Embodiment 1 in the aspect of conditions of switching the power generation mode carried out by the control means 24. In FIG. 3, lines D and E respectively indicate amounts of electric load on the electric rotating machine 1.

In the case where the electric load on the electric rotating machine 1 is a partial load and is in a state of the line D, the control means 24 detects an amount of the load by the current detecting means 20 to 22. When the rotating speed of the electric rotating machine 1 is increased, the power generation mode is switched from the inverter generation mode to the alternator generation mode at a point Y2 in the drawing. When the rotating speed of the electric rotating machine 1 is decreased, the power generation mode is switched from the alternator generation mode to the inverter generation mode at a point Z2 in the drawing. If the amount of the electric load is in the state of the line E smaller than the line D, the power generation mode is switched at a point Y3 in the drawing when the rotating speed of the electric rotating machine 1 is increased, and the power generation mode is switched at a point Z3 in the drawing when the rotating speed of the electric rotating machine 1 is decreased.

Power generation efficiency is low in the inverter generation mode as compared with in the alternator generation mode. In other words, when the same amount of power is generated, in the inverter generation mode, more energy is consumed and driving torque of the electric rotating machine 1 is larger. However, controlling the rotating speed in switching the power generation mode conforming to the amount of the electric load as described above makes it possible to select an appropriate rotating speed in switching the power generation mode conforming to the amount of the load. As a result, likewise in the foregoing Embodiment 1, it becomes possible to suppress frequent switchover of the power generation mode and avoid occurrence of shock due to change in engine speed of the internal combustion engine. Furthermore, it becomes possible to suppress the switchover to the inverter generation mode in which energy conversion efficiency in the low-speed rotation range is low, thereby stabilizing engine speed of the internal combustion engine and improve fuel consumption.

Embodiment 3

Figure 4:
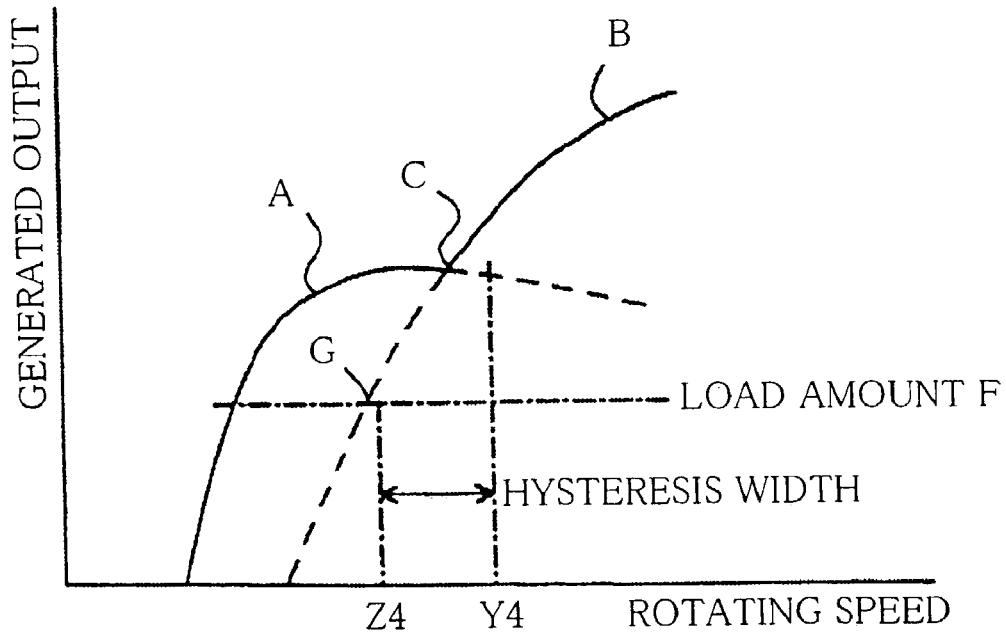
FIG. 4 is a characteristic diagram for explaining a control apparatus for controlling an electric rotating machine for vehicle according to Embodiment 3 of the invention.
Figure 5:
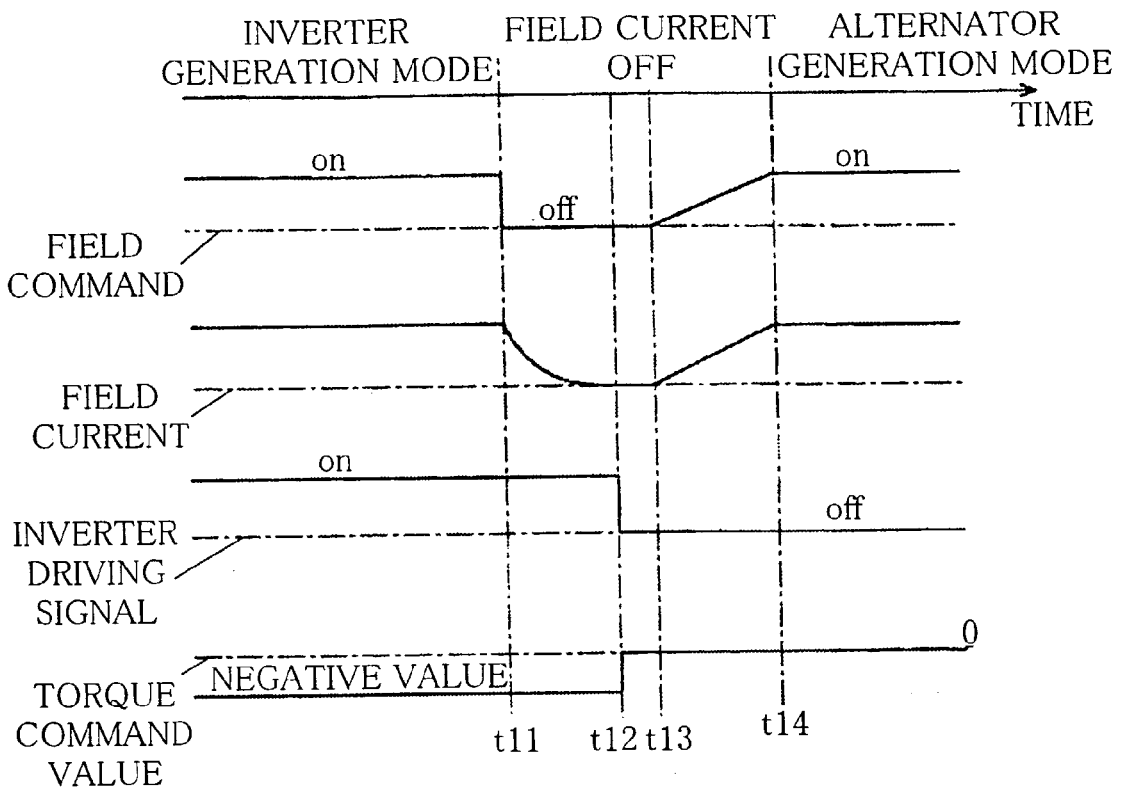
FIG. 5 is a time chart for explaining control of the electric rotating machine for vehicle.
Figure 6:
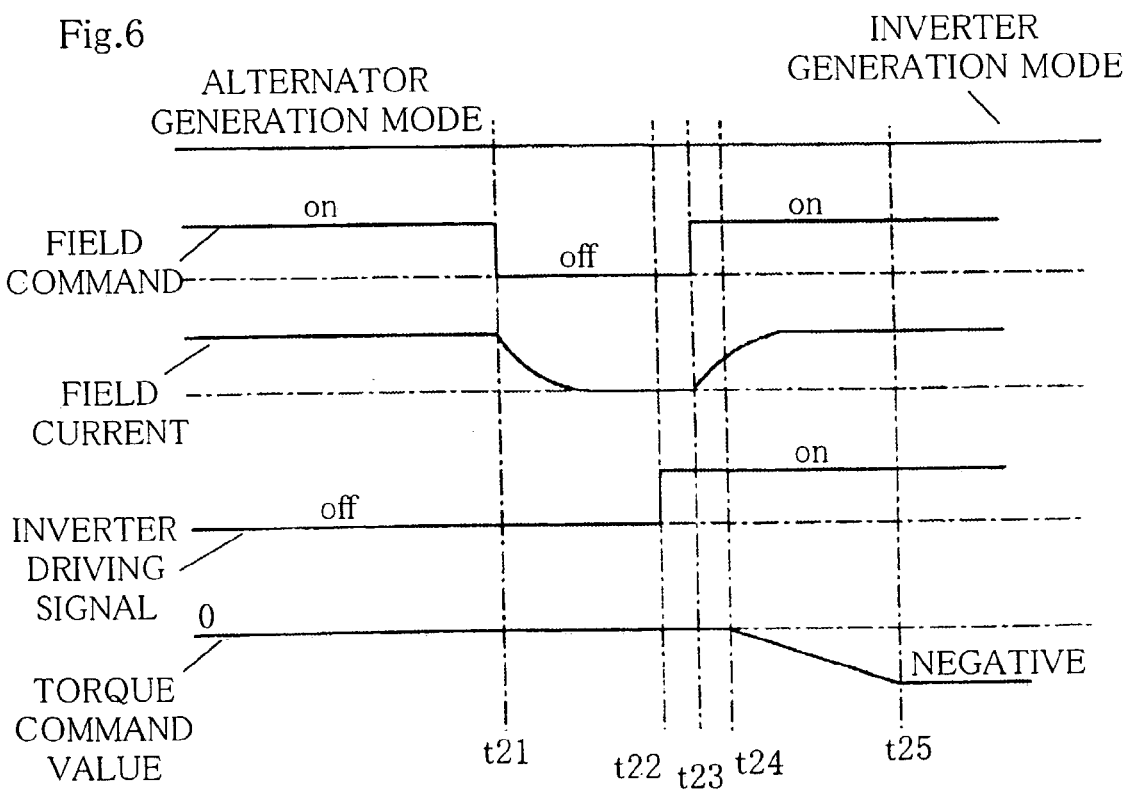
FIG. 6 is a time chart for explaining control of the electric rotating machine for vehicle.

FIG. 4 is a characteristic diagram for explaining operation of a control apparatus for controlling an electric rotating machine for vehicle according to Embodiment 3 of the invention. The control apparatus for controlling an electric rotating machine for vehicle according to this embodiment differs from that in the foregoing Embodiment 1 or Embodiment 2 in the aspect of conditions of switching the power generation mode carried out by the control means 24. Referring now to FIG. 4, a line F indicates an amount of an electric load on the electric rotating machine 1, and a point G indicates an intersection of the electric load amount F and the output characteristic of the electric rotating machine 1 in the alternator generation mode.

In this embodiment, when the electric load on the electric rotating machine 1 is a partial load and is in a state of the line F in FIG. 4, the control means 24 detects an amount of the load by the current detecting means 20 to 22. When rotating speed of the electric rotating machine 1 is increased, the power generation mode is switched from the inverter generation mode to the alternator generation mode at a point Y4 in the drawing, and when the rotating speed of the electric rotating machine 1 is decreased, the power generation mode is switched from the alternator generation mode to the inverter generation mode at a point Z4. The point Z4 at which the power generation mode is switched from the alternator generation mode to the inverter generation mode is selected so that the rotating speed is higher than, or at least the same as, the intersection point G where the output characteristic of the electric rotating machine 1 in the alternator generation mode and the electric load amount F cross each other.

The control means 24 sets the point of switching the power generation mode as described above. As a result, likewise in the foregoing Embodiment 1, it is possible to suppress frequent switchover of the power generation mode and avoid occurrence of shock due to change in engine speed of the internal combustion engine. Furthermore, when engine speed of the internal combustion engine is decreased, the power generation mode is switched to the inverter generation mode before output of the electric rotating machine 1 in the alternator generation mode is decreased below the amount of the electric load. As a result, it is possible to prevent deficiency in power generation amount with respect to the electric load and prevent a decrease in power supply voltage due to deficiency in charging.

Embodiment 4

A control apparatus for controlling an electric rotating machine for vehicle according to Embodiment 4 of the invention differs from those in the foregoing Embodiments 1 to 3 in the aspect that the field current applied to the field coil 4 is temporarily stopped at the time of switching the power generation mode depending upon whether engine speed of the internal combustion engine is increased or decreased. After the switchover of the power generation mode, the control means 24 gradually increases the field current with a predetermined gradient. As a result of the control described above, the driving torque of the electric rotating machine 1 increases gradually at the time of switching the power generation mode. Consequently, it is possible to absorb shock due to change in rotation that might occur at the time of switching the power generation mode.

Embodiment 5

A control apparatus for controlling an electric rotating machine for vehicle according to Embodiment 5 of the invention differs from those in the foregoing Embodiments 1 to 3 in the following aspect. That is, when the rotating speed of the internal combustion engine is increased or decreased and the power generation mode is switched, at the time the rotating speed comes nearly to the switchover rotating speed, the power generation mode is switched by controlling the field current applied to the field coil 4 and the alternating current applied to the armature coil 3 so that the driving torque of the electric rotating machine 1 in the alternator generation mode and the driving torque of the electric rotating machine 1 in the inverter generation mode are almost the same or a difference between them is reduced on condition that the generated output is the same. Owing to the control described above, it is possible to remarkably absorb shock due to change in rotation that might occur at the time of switching the power generation.

What is claimed is:

1. A control apparatus for controlling an electric rotating machine for vehicle comprising:
   an electric rotating machine having an armature coil and a field coil, being connected to an internal combustion engine for vehicle, and functioning as a starter motor as well as a charging generator;
   an inverter for supplying an alternating current to said armature coil of said electric rotating machine;
   field current control means for controlling electric current of said field coil; and
   control means for controlling operation of said electric rotating machine, when said electric rotating machine functions as a charging generator, in such a manner that power is generated in an inverter generation mode in which a phase-controlled alternating current is applied from said inverter to said armature coil and a generated voltage is subject to step-up chopper control in low-speed rotation range, and that power is generated in an alternator generation mode by controlling the electric current of said field coil in high-speed rotation range;
   wherein said control means establishes a hysteresis between a first rotating speed of said rotating electric machine at which said rotating electric machine is switched from said inverter generation mode to said alternator generation mode by said control means and a second rotating speed of said rotating electric machine at which said rotating electric machine is switched from said alternator generation mode to said inverter generation mode by said control means.

2. The control apparatus for controlling an electric rotating machine for vehicle according to claim 1, wherein said control means variably selects the first rotating speed for switching from said inverter generation mode to said alternator generation mode and the second rotating speed for switching from said alternator generation mode to said inverter generation mode on the basis of an amount of electric load of said electric rotating machine.

3. The control apparatus for controlling an electric rotating machine for vehicle according to claim 1, wherein the first rotating speed for switching from said alternator generation mode to said inverter generation mode is controlled by said control means in such a manner that a generated output in said alternator generation mode is at least higher than a generated output in said inverter generation mode.

4. The control apparatus for controlling an electric rotating machine for vehicle according to claim 1, wherein the electric current applied to said field coil is temporarily stopped when said control means switches to the inverter generation mode or the alternator generation mode, and the control means applies a gradually increasing electric current on the basis of a predetermined time constant after the switchover of the power generation mode.

5. The control apparatus for controlling an electric rotating machine for vehicle according to claim 1, wherein, at the time of switching to the inverter generation mode or the alternator generation mode, said control means controls the electric current of said field coil and said alternating current applied by said inverter to said armature coil in such a manner as to reduce a difference between a driving torque of said electric rotating machine in said alternator generation mode and a driving torque of said electric rotating machine in said inverter generation mode when the same amount of power is generated in said inverter generation mode and said alternator generation mode.

6. A control method for controlling an electric rotating machine for vehicle, in which when an electric rotating machine, which is connected to the internal combustion engine for vehicle to function as a starter motor as well as a charging generator, acts as a charging generator, power is generated in an inverter generation mode in which phase-controlled alternating current is applied by an inverter to an armature coil of said electric rotating machine and generated voltage is subject to step-up chopper control in a low-speed rotation range, and power is generated in an alternator generation mode in which electric current of a field coil of said electric rotating machine is controlled in a high-speed rotation range;

the control method comprising:

switching the power generation mode from said inverter generation mode to said alternator generation mode at a first predetermined rotating speed when the rotating speed is increased; and switching the power generation mode from said alternator generation mode to said inverter generation mode at a second predetermined rotating speed when the rotating speed is reduced; whereby a difference is established between said first predetermined rotating speed and said second predetermined rotating speed.

7. The control method for controlling an electric rotating machine for vehicle according to claim 6, wherein said second predetermined rotating speed is lower than said first predetermined rotating speed.

8. The control method for controlling an electric rotating machine for vehicle according to claim 6, wherein said first predetermined rotating speed and said second predetermined rotating speed are set on the basis of an amount of electric load of said electric rotating machine.

9. The control apparatus for controlling an electric rotating machine for vehicle according to claim 1, wherein said first rotating speed is less than said second rotating speed.

10. The control apparatus for controlling an electric rotating machine for vehicle according to claim 1, wherein said control means switches said rotating electric machine from said inverter generation mode to said alternator generation mode at said first rotating speed when a rotating speed of said rotating electric machine increases and switches said rotating electric machine from said alternator generation mode to said inverter generation mode at said second rotating speed when said rotating speed of said rotating electric machine decreases.

* * * * *